Patented Dec. 1, 1936

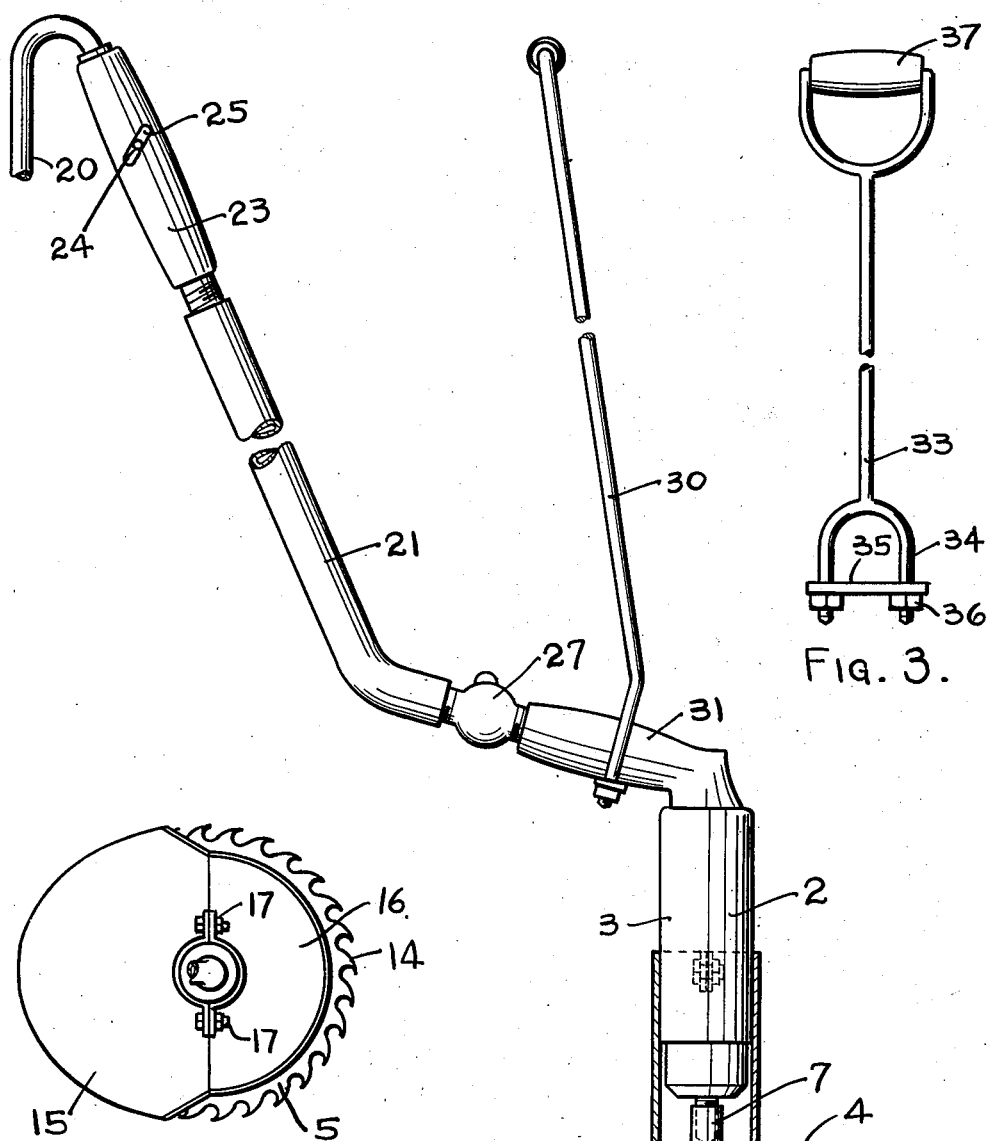

2,062,820

UNITED STATES PATENT OFFICE 2,062,820

WEED CUTTER

Orbra C. Pierce, Waco, Tex., assignor of one-fifth to Gibb Gilchrist, one-fifth to J. B. Early, one-fifth to John L. Green, all of Travis County, Tex., and one-fifth to E. C. Woodward, McLennan County, Tex.

Application July 6, 1934, Serial No. 733,948

1 Claim. (Cl. 30—11)

The invention relates to an improvement in cutting machines and particularly of the type used in cutting weeds, grass, brush, shrubs and similar vegetation.

It is one of the objects of the invention to devise a machine which is of particular advantage in cutting vegetation along highways, streets and the like, particularly in inaccessible places where larger machines can not operate in a practical manner.

It is another object of the invention to provide a power-driven cutter which can be readily manipulated by the operator to swing it into and out of cutting position with ease.

It is another object of the invention to provide a motor-driven cutter which may be readily operated to cut vegetation and underbrush by swinging the cutter against the materials which are to be cut.

Another object of the invention is to provide a pair of spaced handles on a power-driven cutter so that the handles may be readily grasped by the operator and the power-driven cutter may be manipulated in substantially the same manner in which a scythe would be operated.

Other and further objects of the invention will be readily apparent when the following description is considered in connection with the accompanying drawing wherein Fig. 1 is a side elevation of a power driven cutter constructed in accordance with the invention and illustrating the guard and cutter disc in section.

Fig. 2 is a top plan view of the motor, cutter and guard of Fig. 1 with the lateral handle broken away.

Fig. 3 is a view of the vertical handle detached from the cutter.

In the cutting of vegetation in and around fences, posts, and similar locations it is often difficult to effect proper cutting of the vegetation by a mower or similar machine. The removal of such vegetation by hand is a tedious task and in order to avoid this the present invention has been devised. It contemplates a cutter which is indicated generally at 2, and embodies a head 3 which serves to support a suitable guard member 4 as well as a rotating cutter blade 5. The motor may be of any desired type either electrical or fluid-pressure as desired. In the present illustration, however, a fluid-pressure motor has been illustrated as being embodied inside of the body 3. Various types of compressed air or fluid pressure turbines and motors of this type are well known and any such suitable motor may be utilized. In some locations, however, an electrical motor may be desired and for purposes of illustration it may be considered that any suitable type of motor is contemplated inside of the housing 3.

Extending from the housing 3 is a drive shaft 7 which is provided with a shoulder 8 against which the cutter blade 5 is adapted to seat. A suitable washer 9 and nut 10 retain the cutter disc or blade in position upon the shaft, so that rotation of the shaft accomplishes rotation of the blade. As seen in Fig. 2 the blade is provided with properly designed cutting teeth 14 which may be varied in accordance with the vegetation to be cut but preferably of a type which will not become clogged or blocked with the materials being cut.

To protect the operator and to assist in removing the cut materials from the teeth 14 of the blade the guard section 4 has been attached to the body 3. This guard section is seen in plan view in Fig. 2 and includes the rear guard portion 15 which completely overlies the cutter blade 5 so that when the machine is moved rearwardly it will not perform any cutting action. The front portion 16 of the guard, however, closely approximates the periphery of the cutting disc and prevents the cut materials from falling on top of the blade and interfering with its rotation. These parts 16 and 15 are shown as clamped around the body portion by means of bolts 17 so that they may be readily removed in event the cutters should become clogged with material.

As previously stated, the motor may be of any desired type. That illustrated, however, is a fluid-pressure motor adapted to be operated from any suitable source of pressure such as compressed air, steam, or other fluid pressure. A conduit or connection 20 is shown as leading into the handle 21 to conduct the fluid pressure into the motor. In event an electric motor is used, however, this conduit would carry suitable electric wiring.

A gripping member 23 is provided on the handle 21 and is arranged for sliding and rotating movement by means of a pin 24 and slot 25. In this manner rotation of this gripping member serves to control the operation of the motor so that any desired speed of operation may be obtained. An oil cup is illustrated at 27 and may be provided to feed lubricant into the stream of fluid or to the motor in order to lubricate the same. It will be particularly noted that the handle 21 extends laterally from the motor or saw member so that it may be conveniently gripped by an operator when he is standing slightly behind the rotating blade. Normally this handle 21 would be gripped by the right hand of the operator.

In order that the device may be suitably supported by the operator for swinging movement to engage the materials to be cut a substantially vertical handle 30 has been connected to the handle portion 31 of the main handle 21 where it extends laterally from the housing 3. Fig. 3 shows a front elevation of this handle which embodies a rod 33, a yoke 34, and a clamping bar 35, so that it may be rigidly attached to the main handle by means of the nuts 36. The bar 33 is enlarged to provide a grip member 37, which would normally be gripped by the left hand of the operator. By this arrangement the handles 21 and 30 are spaced apart so that they may be conveniently grasped by the operator to support the device in a manner that it may be swung to and fro to accomplish the cutting of the vegetation. In fact, with these handles the device would be grasped in substantially the same manner as they would grasp a scythe and the cutter can be swung with the same type of movement. In this manner a great amount of vegetation may be cut in a short period of time because of the speed of operation of the cutter disc. It will be understood that sufficient power may be provided to operate the device at any desired speed.

It seems obvious that the operator can control the elevation at which the vegetation is to be cut by adjustment of the handle 30 or holding the device at the desired elevation. Rotation of the grip 23 serves to control the speed of operation of the blade while the device is being operated so that the amount of cutting can be varied in accordance with the vegetation encountered.

What is claimed as new is:

A power-driven vegetation cutter of the type to be swung like a scythe in the cutting of vegetation close to the ground and in and about fences, trees and the like, said cutter including a body portion, a motor disposed in said body, a shaft extending from the lower end of said body and connected to the motor, a cutter fixed to said shaft, a guard member above part of said cutter including an upstanding sleeve fixed to said body, a handle angularly extending from the upper end of said body, an upwardly extending portion on said handle including a grip, an auxiliary handle clamped to the angular portion of said first handle and extending upwardly with a grip thereon, both of said grips being at an elevation so that they may be conveniently grasped by the operator to swing the cutter device against the vegetation.

ORBRA C. PIERCE.